United States Patent [19]

Schneiter et al.

[11] 4,013,010
[45] Mar. 22, 1977

[54] GAS GENERATOR WITH EXPANDABLE CARTRIDGE

[75] Inventors: Fred E. Schneiter, North Ogden; Philip R. Dykstra; Carver G. Kennedy, both of Brigham City, all of Utah

[73] Assignee: Thiokol Corporation, Newtown, Pa.

[22] Filed: Nov. 4, 1974

[21] Appl. No.: 520,577

[52] U.S. Cl. .................. 102/39; 23/281; 280/740; 280/741; 280/742
[51] Int. Cl.² .......................... F42B 3/04
[58] Field of Search .............. 102/39, 40, 90; 280/150 AD, 734–742; 23/281; 60/432–438

[56] References Cited
UNITED STATES PATENTS

| | | | |
|---|---|---|---|
| 3,515,518 | 6/1970 | Halstead et al. | 102/39 X |
| 3,674,284 | 4/1972 | Lohr | 280/150 AB |
| 3,715,131 | 2/1973 | Hurley | 280/150 AB |
| 3,733,180 | 5/1973 | Heineck et al. | 280/150 AB X |
| 3,773,352 | 11/1973 | Radke | 250/150 AB |
| 3,797,854 | 3/1974 | Poole et al. | 23/281 |
| 3,865,660 | 2/1975 | Lundstrom | 280/150 AB |
| 3,877,882 | 4/1975 | Lette et al. | 102/39 |
| 3,880,447 | 4/1975 | Thorn et al. | 102/39 X |
| 3,891,233 | 6/1974 | Damon | 280/150 AB |

Primary Examiner—Harold Tudor
Attorney, Agent, or Firm—Stanley A. Marcus; Edward E. McCullough

[57] ABSTRACT

The invention, which is especially useful for inflating safety cushions for automotive vehicles, is essentially an orificed housing and an expendable cartridge therein. The cartridge has a hermetically sealed can containing a layer of gas generant material in one end contiguous with a tubular-shaped igniter including an electric squib and pyrotechnic material to be ignited thereby. A layer of filter screens is included between the ignition device and a perforated partition. The remainder of the can is filled with an annulus formed by annular wrappings of wire screen and a central bag of pH neutralizing material. The perforations in the partition are centered over the neutralizing material so that the slightly alkaline gases from the burning gas generant and ignition device must pass through the pH neutralizing material before passing through the annular wrappings of screen and rupturing the wall of the can to inflate a safety cushion. This disposable cartridge is closely supported on all sides by the housing, except at the orifices thereof, so that rupturing of the can may occur only at the orifices when the gas generator is fired.

6 Claims, 3 Drawing Figures

GAS GENERATOR WITH EXPANDABLE CARTRIDGE

CROSS-REFERENCE TO RELATED APPLICATIONS

This invention is related to a copending application, owned by the same assignee, titled "Gas Generator" by Fred E. Schneiter, et al, Ser. No. 417,349, filed Nov. 19, 1973.

BACKGROUND OF THE INVENTION

This invention relates broadly to gas generators, and particularly to gas generators having expendable cartridges for inflating safety cushions for automotive vehicles.

Gas generators that are known in the prior art for inflating safety cushions for automotive vehicles have been constructed primarily by placing the various components within a structural housing having orifices for expelling gases into an inflatable cushion. Although some parts were recoverable after firing of the gas generator, it was necessary to rebuild the generator in order to reuse such parts; and the rebuilding was not normally within the capability of the vehicle owner. Since such rebuilding at the factory was economically unfeasible, the entire gas generator became expendable on being fired.

The copending application cited above teaches enclosing the gas generant material and ignition device in a hermetically sealed, rupturable can. The purpose of this feature in that application, however, was to separate the flammable materials from other components. This tended to facilitate shipping, handling, and storage of components. Also, the flammable materials were the only parts subject to deterioration by exposure to moisture, etc.; and, hence, needed to be hermetically sealed in a special can. Nevertheless, since several of the expendable components were outside this can, the spent gas generator still could not be reclaimed.

SUMMARY OF THE INVENTION

The present invention is an improvement on the invention cited above in that all components that are disposable or likely to be damaged when the gas generator is fired are included in the hermetically sealed can.

This provides an expendable cartridge that may be easily removed from a structural housing when spent and may be easily installed by the vehicle owner in the recoverable housing for refurbishment of the gas generator. Hence, for repeated use, the vehicle owner needs only to buy the replaceable cartridge, rather than an entire gas generator, thus greatly reducing the cost of the system.

Such a cartridge, capable of producing a known quantity of gas, may also be used to represent a convenient unit of gaseous volume. As such, it may be used in various applications and in gas generator housings of various configurations.

The cartridge of the invention has a hermetically sealed contained or can divided into first and second chambers by a perforated partition. The first chamber contains a gas generant material contiguous with an ignition means that comprises an electric squib in the presence of pyrotechnic material. On receipt of a signal, the squib fires, igniting the pyrotechnic material, which in turn ignites the gas generant. Filtering screens between the perforated partition and these combustibles in the first chamber remove any solid particles that may be contained in the resulting gases before they flow through the perforations in the partition. A gas cooling means is provided by annular wrappings of fine mesh wire screen inside the wall of the second chamber. A relatively coarse screen is inserted between the fine screen and the wall of the can. The gases are commonly slightly alkaline as they flow through the perforations of the partition, hence, a plastic bag of pH neutralizing material is enclosed and surrounded by the cooling screens; and, since the perforations of the partition are centrally located, the pH neutralizing material essentially lies between these perforations and the cooling screens so that gases must pass through the neutralizing material. This cartridge is enclosed in a housing that supports all sides of the container except for the wall thereof at the sites of the orifices in the housing (adjacent the cooling screens); so that gases emerging through the cooling screens may rupture the wall of the container at the sites of the orifices. This housing may either be substantially cylindrical in form to contain only one cartridge, or it may be in an elongated or other configuration to contain several of the cartridges. The housing is formed, at least in parts by two half shells and is equipped with a mounting flange that surrounds at least one of the shells. These two half shells may be joined together by any of a number of different means such as by screw threads, clamps, or screws.

After the gas generator has been fired, it may be easily refurbished for repeated use simply by opening the housing, removing the spend cartridge, and replacing it with a new one. The cartridge of the invention may also be standardized to represent a given volume of gas, whereby it may be used as an aid in designing gas generators of various configurations. These attributes are therefore the objects of the invention. Important features of the invention are that it is simple and reliable in construction and may be easily manufactured, stored, and handled.

Other objects and advantages of the invention may be noted as the following detailed description is read with reference to the accompanying drawings, wherein the same parts are designated by the same numbers throughout the disclosure.

DESCRIPTION OF THE PREFERRED EMBODIMENTS

Figure 1:
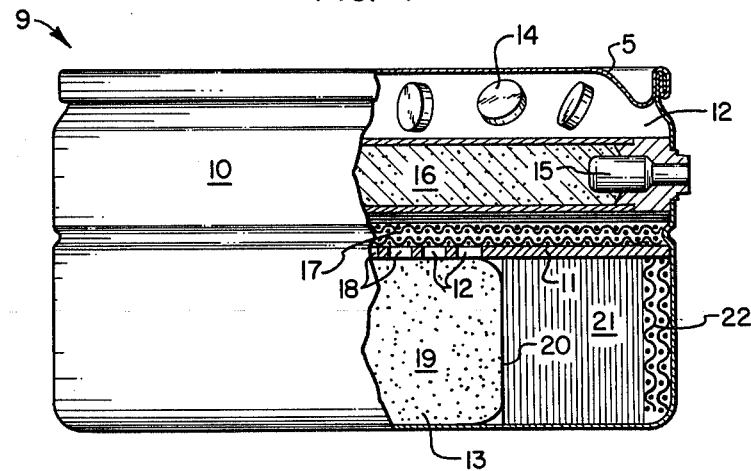
FIG. 1 is a side elevation of the cartridge portion of the invention, shown partially in section.
Figure 2:
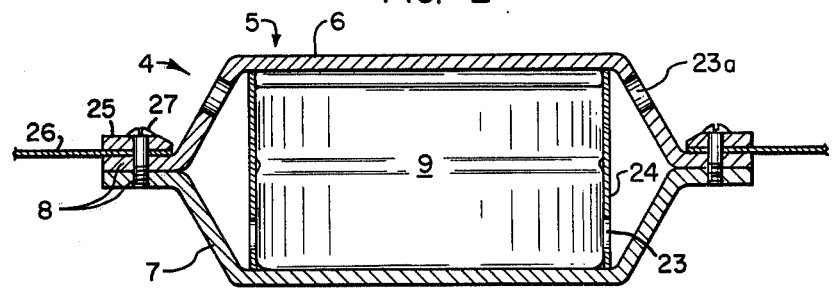
FIG. 2 is a side elevation showing the housing in section.
Figure 3:
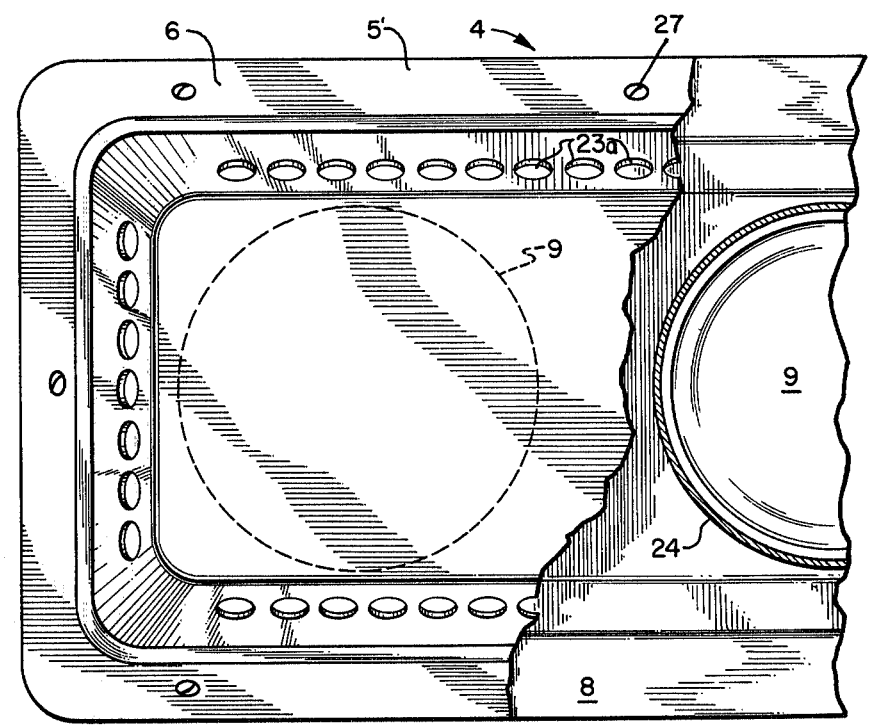
FIG. 3 is a top view of an elongated housing wherein a series of the cartridges may be installed.

The gas generator 4 incorporates a housing 5 that includes at least one cylindrical member 24 confined between two half shells 6 and 7, each having a mounting flange 8. They may be joined together by screws 27 that pass through holes in the mounting flanges 8. These screws may also attach the gas generator 4 to appropriate parts of the automotive vehicle in which it may be installed, and to a bag mounting flange 25 and the bag to be inflated 26.

A cartridge 9, to be installed in the housing 5, has a thin-walled container 10 that is preferably made of aluminum and is hermetically sealed similar to conventional cans for containing foods and beverages. A centrally perforated partition 11 divides the container 10 into a first chamber 12 and a second chamber 13. The first chamber 12 contains gas generant material 14. Although this gas generant may be any one of a number of compositions meeting the requirements for burning rate, nontoxicity, and flame temperature, preferred material is a mixture by weight of 55% sodium azide ($NaN_3$), and 45% anhydrous chromic chloride ($CrCl_3$) in the form of pellets. Contiguous with the gas generant is an ignition means that includes an electric squib 15 in the presence of pyrotechnic material 16. This pyrotechnic material may also be any of a number of compositions, however, a preferred material is granular mixture of 25% by weight of boron and 75% of potassium nitrate.

A filter screen 17 is provided between these combustibles and the perforated partition 11 by a plurality of layers of relatively fine wire screen (about 30 to 60 mesh). This screen filters out any solid particles that may be contained in the gases, resulting from combustion of the ignition means and gas generant, before they pass through the perforations 18 in the partition 11.

The second chamber 13 contains a pH neutralizing material 19 in a thin plastic bag 20, preferably made of polyethylene film. A preferred pH neutralizing material 19 is powdered iron sulfate, $Fe_2(SO_4)_3$ or $FeSO_4$. A gas cooling filter 21 surrounding the pH neutralizing material 19 has the form of an annulus made by annular wrappings of a relatively fine screen (about 30 to 60 mesh). A plurality of layers of a relatively coarse screen 22 (about 8 to 16 mesh) surrounds the cooling filter.

The container 10 of this cartridge 9 is rupturable at the sites of the orifices 23 in the housing 5 adjacent the cooling screen 21. The coarse screen 22 provides a relatively unobstructed, free-flow space for the gases to escape through the orifice 23.

The container 10 is mass produced by conventional machinery used for forming and sealing beverage cans. To be reliably handled and formed by such machinery the starting aluminum sheet stock is about 16.5 mils thick. This thickness, however, is too great to be reliably ruptured with the required speed by gases produced from the burning gas generant 14. However, the wall of the container becomes approximately five mils thick by the process of drawing it into the shape of the container 10. This five mil thickness, is optimum both for reliably maintaining strength and the hermetic seal of the container 10; and, at the same time, for reliably and rapidly rupturing when subjected to the gas pressure produced by the burning gas generant 14.

On impact of the vehicle with another object, a sensor, not shown, delivers an electric pulse to the squib 15, which ignites the gas generant 14 via the pyrotechnic material 16. The resulting gases then flow through the filtering screen 17, where any solid particles are removed. They then flow through the perforations 18 in the partition 11 and destroy the plastic bag 20 so that the alkaline content of the gases may be neutralized by the material 19 therein. The gases then pass through the filtering and cooling screens 21 and rupture the container 10 at the housing orifices 23 to flow through offices 23a into a inflatable structure 26. This entire sequence is completed within 35 milliseconds of the collision.

A invention has been described that advances the art of safety devices for automotive vehicles. Although the preferred embodiment has been described quite specifically with regard to detail, it should be noted that many such details may be altered without departing from the scope of the invention as it is defined in the following claims.

The invention claimed is:

1. A gas generator comprising: a housing comprising two half shells forming a box-like structure with orifices therein, and a plurality of orificed, hollow cylinders inside said structure, the ends of the cylinders being closed by the half shells; and expendable cartridge in each of the cylinders comprising an easily-rupturable, hermetically-sealed container; a perforated partition dividing the container into first and second chambers; gas generant material in the first chamber; an ignition means contiguous with the gas generant material; gas cooling means adjacent the inner wall of the second chamber of the container; and pH neutralizing material between the cooling means and the perforations of the partition, so that gases from the burning gas generant material passing through the perforations in the partition must pass through the pH neutralizing material--the housing closely supporting the container on all sides except for the orifice sites in the surrounding cylinder, which are adjacent the cooling means, whereby gases passing through the cooling means may rupture the container only at the orifices.

2. The gas generator of claim 1 wherein the ignition means comprises an electric squib and pyrotechnic material in the presence thereof.

3. The gas generator of claim 1 wherein the cooling means comprises annular wrappings of wire screen inside the wall of the container, and the pH neutralizing material is enclosed and surrounded thereby.

4. The gas generator of claim 3 wherein the wrappings of wire screen comprising the cooling means are approximately 30 to 60 mesh and are surrounded by a plurality of layers of relatively coarse wire screen of approximately 8 to 16 mesh to promote a free-flow of gases through the orifices of the housing.

5. The gas generator of claim 1 further including a layer of filter screens adjacent the partition in the first chamber, whereby any solid particles in gases produced by the gas generant and ignition means may be removed before they enter the pH neutralizing material through the perforations in the partition.

6. The gas generator of claim 1 wherein the housing is elongated in form and contains a plurality of cartridges.

* * * * *